Figure 1:
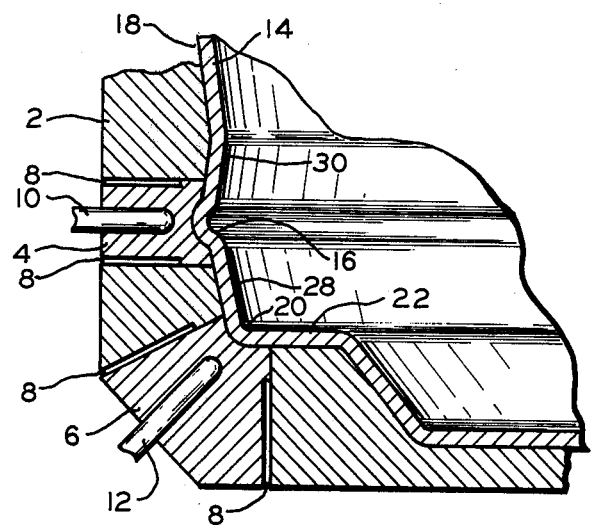

United States Patent [19]

Uhlig

[11] 4,117,062

[45] Sep. 26, 1978

[54] METHOD FOR MAKING A PLASTIC CONTAINER ADAPTED TO BE GRASPED BY STEEL DRUM CHIME-HANDLING DEVICES

[75] Inventor: Albert R. Uhlig, Toledo, Ohio

[73] Assignee: Owens-Illinois, Inc., Toledo, Ohio

[21] Appl. No.: 807,704

[22] Filed: Jun. 17, 1977

[51] Int. Cl.$^2$ ............................................. B29C 17/07
[52] U.S. Cl. ...................................... 264/94; 264/296; 425/525; 425/526
[58] Field of Search ............... 264/89, 90, 92, 94, 264/96–99, 296, 327; 425/525, 526, 530

[56] References Cited

U.S. PATENT DOCUMENTS

| | | | |
|---|---|---|---|
| 3,198,861 | 8/1965 | Marvel | 264/98 |
| 3,234,310 | 2/1966 | Edwards | 264/327 X |
| 3,781,395 | 12/1973 | Uhlig | 264/89 |
| 3,949,034 | 4/1976 | Uhlig | 264/89 |

FOREIGN PATENT DOCUMENTS 696,380  10/1965  Italy ............................................ 264/94

*Primary Examiner*—Jan H. Silbaugh
*Attorney, Agent, or Firm*—Charles S. Lynch; E. J. Holler

[57] ABSTRACT

Disclosed is a method of making a hollow plastic article by blow molding, followed by reshaping said article by mechanical means outside the blow mold. Also disclosed is a plastic drum having an integral upstanding peripheral plastic rim adapted to be grasped by steel drum chime-handling devices.

2 Claims, 8 Drawing Figures

METHOD FOR MAKING A PLASTIC CONTAINER ADAPTED TO BE GRASPED BY STEEL DRUM CHIME-HANDLING DEVICES

This invention relates to a method for making a hollow plastic article by blow molding followed by mechanical reshaping outside of the mold before the article has fully set. In a more specific aspect the invention relates to a plastic drum or container having an integral upstanding peripheral plastic rim adapted to be grasped by standard steel drum chime-handling devices, and to a method of making such a drum.

Many useful hollow plastic articles have in the past been made by the well-known, efficient and inexpensive technique known as blow molding, whereby a generally tubular parison in a heated, softened condition is enclosed in the halves of a blow mold and expanded by the pressure of a gas injected into the parison until it conforms to the shape of the mold.

Such blow molding processes have their limitations with regard to shapes that can be made, including in particular the difficulties encountered in forming a hollow plastic article having significantly increased wall thicknesses in selected areas, particularly when the parison is an essentially cylindrical tube.

Attempts have been made to provide practical machinery for reshaping a blow molded article while it is still in the mold. See, for instance, Hagen U.S. Pat. No. 3,050,773 dated Aug. 28, 1962, and Uhlig U.S. Pat. No. 3,843,005 dated Oct. 22, 1974. However, such blow molds with after shaping mechanisms are limited in their application and make the blow molding machinery so complicated that is expensive and can be subject to excessive breakdowns. Also, effecting after shaping in the mold greatly lengthens the cycle in the blow mold, seriously cutting the productivity rate per machine.

The method of the present invention finds one particular application in overcoming a problem impeding the development of large closed plastic drums which have been introduced in recent years to replace steel drums, such as the well-known standard 55 gallon and 30 gallon steel drums. Because of the long time usage of steel drums for handling of materials in bulk, standard equipment has been developed to handle such drums by gripping the chime thereof in order that the drums may be transported and moved. That type of standard equipment is generally recognized, and referred to in the art, as steel drum chime-handling devices or, simply, chime-handling devices. One type of chime-handling device which has wide utility is referred to in the art as a parrot-beak device or, occasionally, as a cherry picker and one such device is sold by the Little Giant Company under the designation Grip-O-Matic. This type of device includes two opposed pivotal, or movable, jaws or beaks which, when brought into contact with a chime on a drum are adapted to open so as to allow them to be positioned with the chime between them, and upon lifting of the drum, the chime is lockingly gripped between the jaws or beaks, allowing for movement and transportation. Other chime-handling devices, such as those referred to as a chime-grabber, and hand truck, likewise include a beak, or jaws, or hooks, to exert a localized force on the chime which allows for the drum to be lifted and then appropriately moved.

More recently, plastic drums have been made available for much the same service as steel drums, but unfortunately these drums have not yet attained their full potential. It will be appreciated that such drums offer many highly desirable characteristics. Some of these desirable characteristics include, for example, low price, low shipping costs, a wide scope of product application without the need for liners, ability to handle materials corrosive to metals, high resistance to the detrimental influence of weather, low unit weight, rust resistance, dent resistance, and in general they are highly esthetically pleasing. A significant deterrent to the wider acceptance and usage of such plastic drums, such as one-piece, blow mold plastic drums, has been that conventional steel drum chime-handling devices cannot conveniently and interchangeably be employed with plastic drums and steel drums for movement and expeditious handling of both.

It is an object of the present invention to provide a practical method of making a hollow plastic article by blow molding a preform and reshaping said preform mechanically outside the blow mold.

It is another object of the invention to provide a method of making a plastic container such as a drum having an integral plastic rim adapted to be grasped by steel drum chime-handling devices.

It is a further object of the invention to provide a plastic drum having an integral plastic top rim adapted to be grasped by steel drum chime-handling devices.

Other objects, features and aspects, as well as advantages, of the present invention will become apparent from a study of the following description and drawings.

According to one aspect of the present invention, a method is provided for forming a hollow plastic article comprising blow molding a preform and subsequent reshaping outside the mold. A generally tubular plastic parison is enclosed in the halves of a blow mold cavity in a warm, inflatable state and is blown in the usual manner to produce a hollow preform which conforms to the shape of the mold cavity. As is usual in blow molding, during and following the blowing to shape, the molded article is cooled. Most of the cooling takes place by contact of the external walls of the preform with the relatively cool mold, so that a skin is formed on the outside of the preform which is relatively cool and rigid compared to the interior wall portions of the molded preform. The internal surfaces of the walls of the preform are also cooled somewhat by contact with the gas used for expanding in the blow mold. In the present invention the cooling effected by contact with the walls of the mold is differentially controlled in such a manner that selected portions of the external skin so formed and the interior portions of the wall adjacent such skin are at a somewhat higher temperature than the other portions of the preform skin and interior portions of the wall of the preform. The portions so selected to be warmer are those portions that are subsequently to be bent or otherwise reshaped outside the mold, so that such selected portions are in a more easily deformable state. After the blow molding is completed and while the preform is still in the described differential temperature condition, the preform is removed from the mold cavity and is thereafter reshaped outside the mold without further blow molding by mechanically deforming or reshaping portions of the preform deliberately kept in a warmer condition. Thereafter, the final reshaped article is cooled to a rigid condition so as to retain its final shape.

In accordance with a more specific aspect of the invention there is provided a method of forming a plastic container having a reinforced raised circular rim which has at its top a circumferential outwardly radially thickened portion defining a downwardly facing circumferential ledge adapted to be grasped by steel drum chime-handling devices. The method comprises the following steps:

1. Blow molding a generally tubular plastic parison in a mold cavity to produce a preform having a bottom end, a top end and a generally circumferential sidewall between said ends, wherein a rounded peripheral shoulder joins said top and said sidewall which first flares outwardly in the form of the frustum of a cone and subsequently flares inwardly in the form of an inverted frustum of a cone, the frustum and the inverted frustum being connected by a circumferential outwardly radially extending rib forming a downwardly facing circumferential ledge meeting the top of said inverted frustum;

2. During and immediately after the above step 1 of blow molding, differentially cooling the outer surface of the wall of said preform to form a relatively cool and rigid outer skin while maintaining the material between the wall surfaces of said container at a deformable temperature but maintaining the outer skin and interior of the wall of said shoulder and of said rib a relatively warmer and even more easily deformable temperature;

3. Removing said preform from said mold cavity;

4. Reshaping said preform outside said mold cavity and without further blowing, by the steps of closing a split ring forming assembly around a portion of said preform to enclose and fit the inverted frustum and the bottom and sidewall of the rib before-mentioned and thereafter pressing a circumferential shaping ring against said top end in the direction of said bottom end in an area extending radially inwardly from the juncture of said top end and said shoulder, and continuing said pressing to reshape said preform by bending said preform at the juncture of said frustum and said rib and at said rounded shoulder until (a) the curve of said rounded shoulder becomes reversed, (b) said frustum is repositioned inside said first inverted frustum and becomes itself a second inverted frustum parallel to and pressed against said first inverted frustum and (c) the top of said rib becomes the peripheral top of the thus reshaped preform.

The foregoing reshaping steps form a container with an upstanding ring of double-walled thickness having the beforementioned downwardly facing ledge near its top, which ledge is adapted to be grasped by steel drum chime-handling devices.

5. The final step is to cool the resulting container or drum to a rigid condition.

In a still further aspect of the invention there is provided an improvement in a plastic drum having a top closing end, a bottom closing end and a circumferential sidewall connecting such ends. The improvement comprises providing a circumferential upstanding integral plastic rim extending from the top of said sidewall and surrounding said top closing end and extending at least to the highest part of said top closing end, said rim being approximately twice as thick as said sidewall and having a radially outwardly extending thickened portion at its top, forming a downwardly facing ledge adapted to be grasped by steel drum chime-handling devices.

FIG. 1 is a partial cross-sectional view of a plastic drum preform blown from a tubular parison, shown here while still in the blow mold cavity. The technique of blow molding a hollow article from a tubular parison is well-known and forms no part of the invention except insofar as illustrated in FIG. 1. During and immediately after the blow molding of the tubular parison in blow mold cavity 2, heat is provided in annular sections 4 and 6 of the mold, which are shown isolated thermally by annular air gaps 8. In sections 4 and 6 are means to maintain the temperature of the sections at a higher temperature than the other portions of the blow mold wall. Heat can be provided by means of "annular" resistance heaters 10 and 12 as shown, or by substituting "annular" channels for circulation of hot oil, for instance. While the heating means 10 and 12 have been called "annular" herein, it will be understood that such heating means extend only to nearly the ends of each half of the split mold. It will also be understood that heat at the interior walls of the blow mold is provided mainly by the proximity of and contact with the hot plastic being blown. The purpose of the heaters is to keep the adjacent sections or portions of the drum preform walls at a warmer temperature than other portions. Therefore, it is also possible to accomplish this purpose by hollowing out most of sections 4 and 6 and filling same with insulation material (not shown) of low thermal conductivity and low thermal capacity. The result is to maintain these portions of the walls at a higher temperature than other portions.

Thus, when blown drum preform 14 is formed from a tubular parison, the outer skin of the entire drum is cooled as before discussed but the outer surface of the annular circumferential rib 16 of sidewall 18 and rounded shoulder 20 joining sidewall 18 and top closing end 22 are kept at a somewhat warmer temperature than the balance of the skin and as a result the interior part of the walls of the rib and shoulder are warmer and more deformable than the rest of the preform walls.

Figure 2:
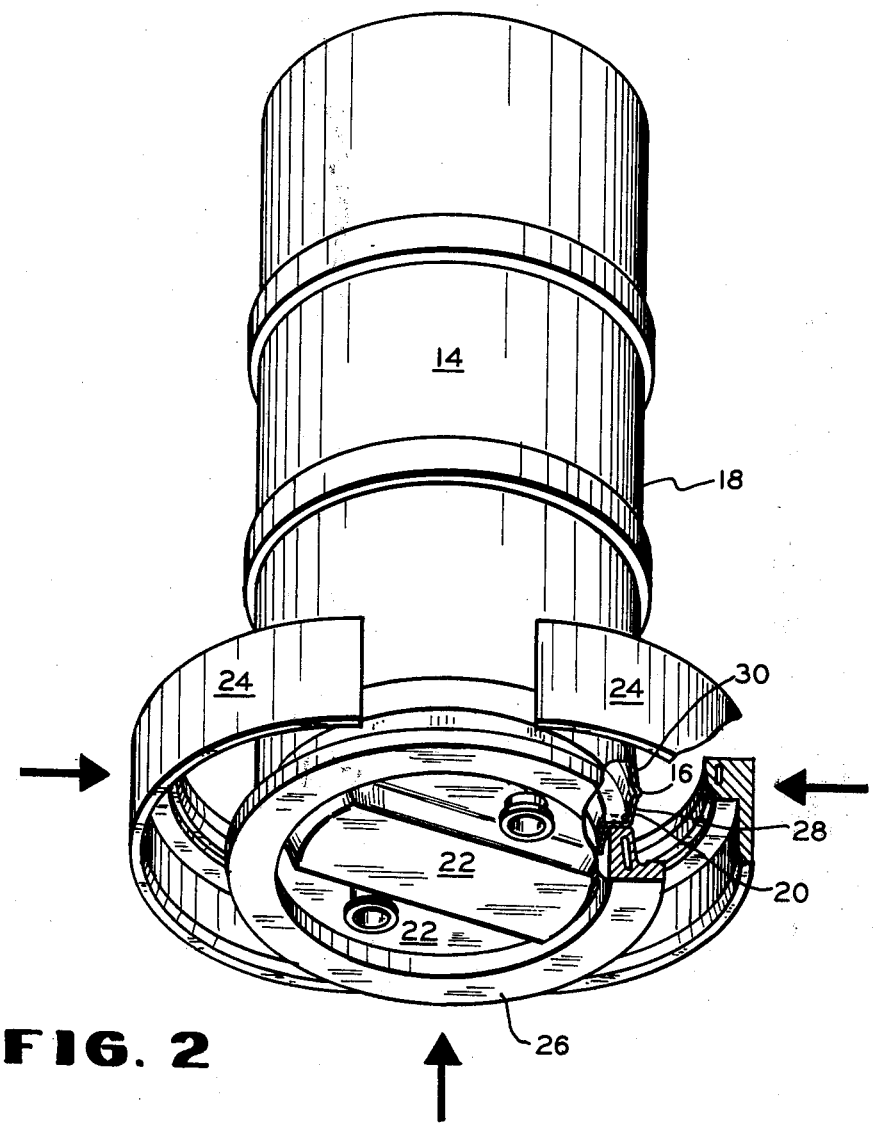
Figure 3:
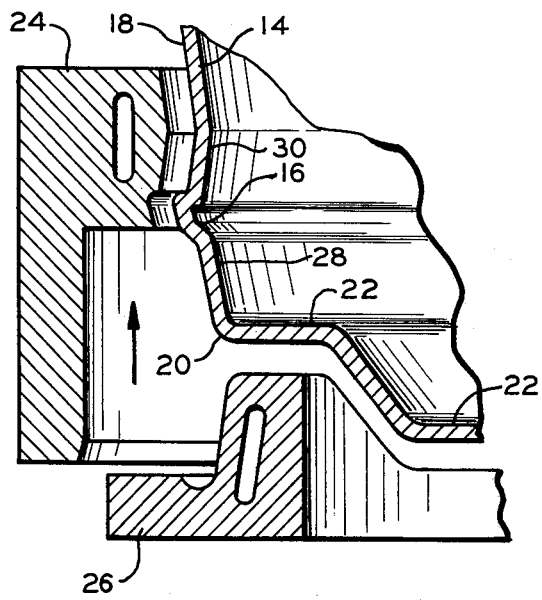
Figure 4:
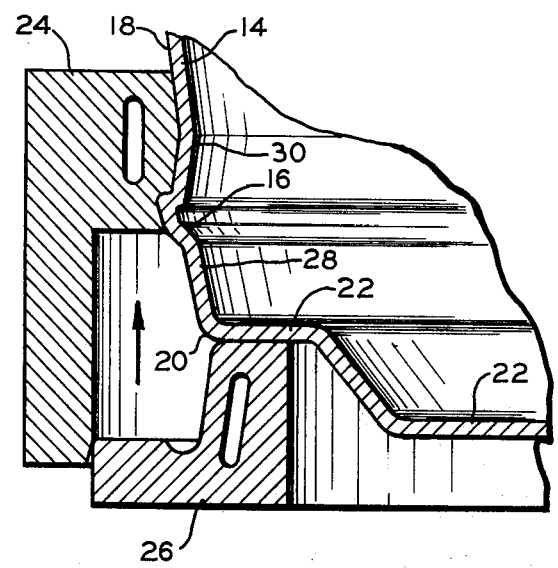

After forming drum preform 14 in the blow mold cavity with the attendant differential cooling as described, the mold is opened and the preform is removed and positioned in reshaping means comprising split ring forming assembly 24 and circumferential shaping ring 26, both shown in perspective in FIG. 2 and in partial cross-section in FIGS. 3-5, 7. In FIG. 2 shaping ring 26 is shown placed against peripheral portions of top closing end 22 extending inwardly from just inside shoulder 20. Also, split ring forming assembly 24 is shown open but ready to close around the drum 14. FIG. 3 is an enlarged partial cross-sectional view of the drum preform and reshaping means in the same stage.

Figure 5:
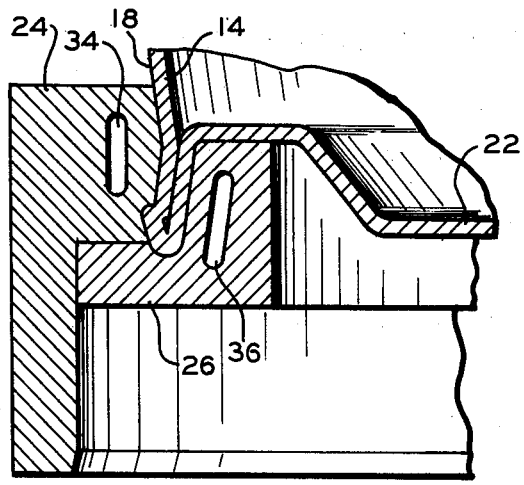
Figure 7:
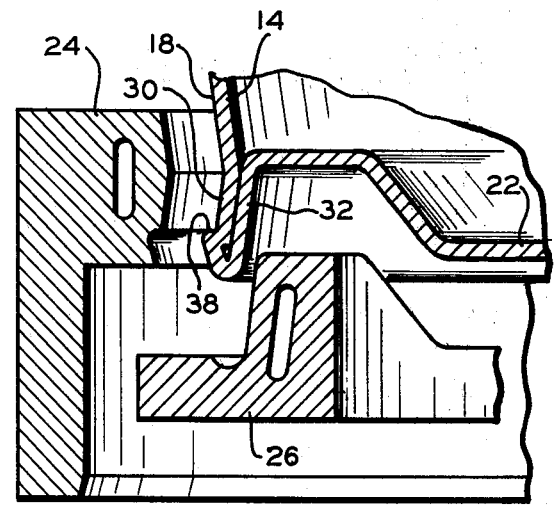
Figure 6:
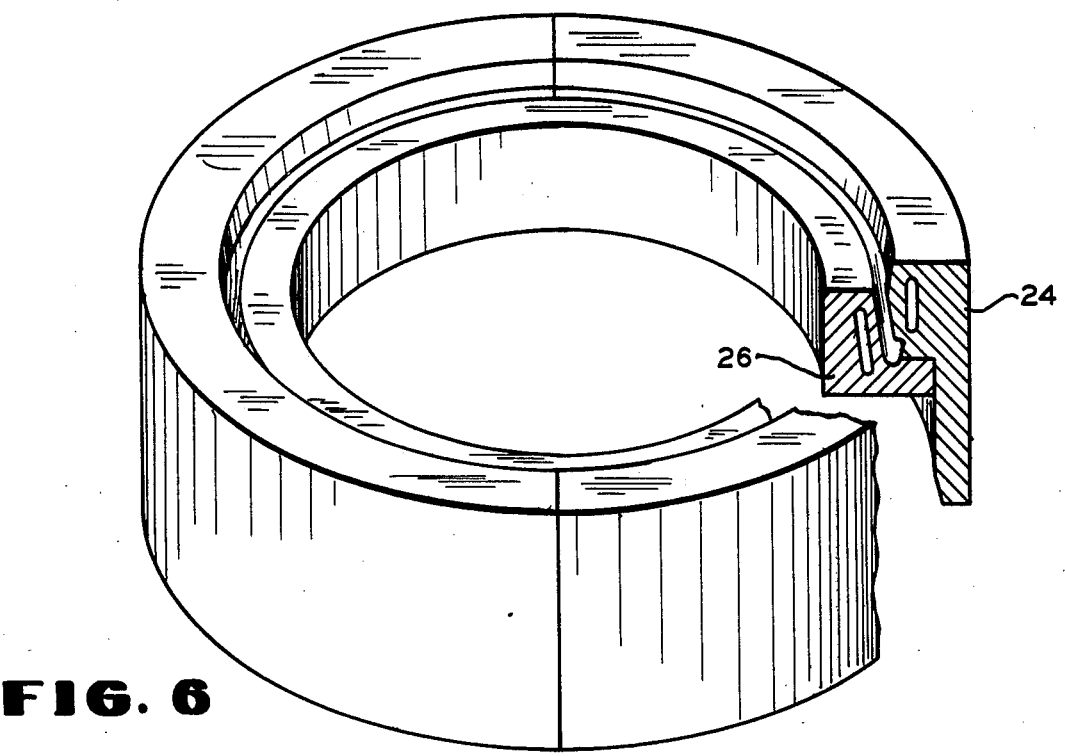
Figure 8:
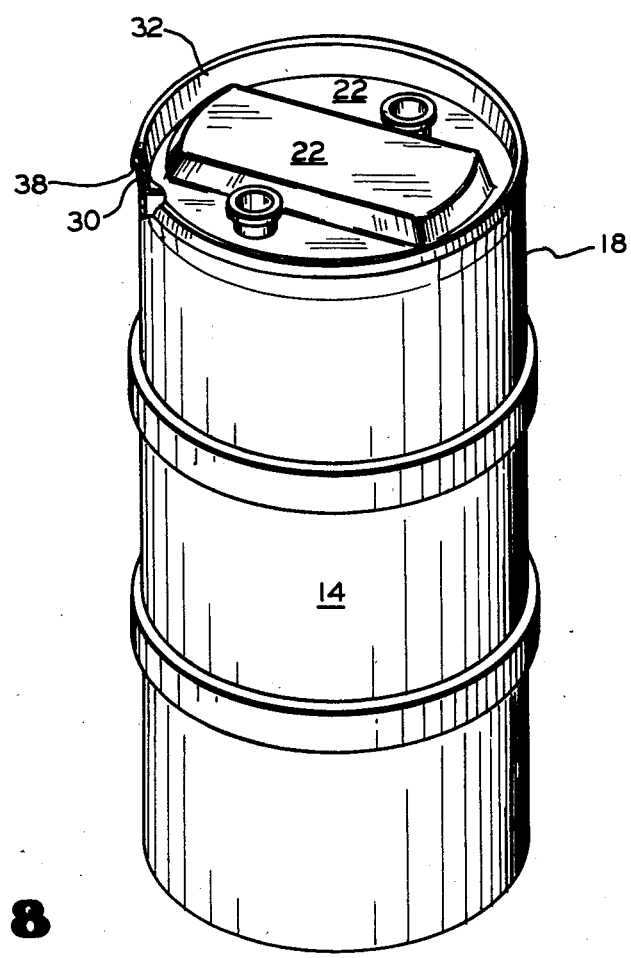

Referring again to FIG. 1, the shape of the blow mold sidewall, and thus the shape of the sidewall of the drum preform, is important to the present process. It is essential that the portion of the drum preform sidewall above annular rib 16 be in the form of a frustum of a cone 28 and that the portion of the drum preform sidewall below annular rib 16 be in the form of an inverted frustum of a cone 30. In the foregoing description when speaking of "above" and "below" one must keep in mind that in FIG. 1 the top of the drum is shown at the bottom of the page. Frustum 28 and inverted frustum 30 are, of course, also shown in FIGS. 3 and 4. The next step in the forming process after that shown in FIGS. 2 and 3 is to close ring halves 24 tightly around drum preform 14 so as to enclose and contact inverted frustum 30 and the bottom and side portions of annular rib 16. Thereafter, as shown in FIG. 5, ring 26 is advanced against the top closing end 22 of the drum toward the bottom closing end of the drum until it is fully closed as in FIG. 5 and is against split ring 24. The advancement of ring 26 reshapes the drum preform by bending the preform at the juncture of frustum 28 and rib 16 and also at the rounded shoulder 20, until the curve of the rounded shoulder becomes reversed and the frustum is repositioned inside the inverted frustum 30 and itself becomes another inverted frustum 32 which is parallel to and pressed against the inverted frustum 30. The spacing between the reshaping parts 24 and 26 in closed position is such that the plastic between opposing faces of the reshaping mold is tightly pressed together to form the shape depicted in FIGS. 5, 7 and 8. FIG. 6 is an enlarged perspective view of reshaping means 24, 26 in fully closed position as in FIG. 5, but without any drum being enclosed. A cut-out portion shows the profile in a radial plane parallel to the axis of the closed assembly.

Finally, cooling medium is circulated through channels 34, 36 (See FIG. 5) and the shaping means are held in closed position until the plastic is rigid, thus permanently forming the annular peripheral upstanding rim of double-walled thickness (30, 32) in the shape of an inverted frustum of a cone having near its top an outwardly flaring thickened portion defining a downwardly facing ledge 38 adapted to be grasped by steel drum chime-handling devices.

The foregoing description of the drawings represents a specific example of the method of the invention wherein (1) a hollow plastic article preform is formed by blow molding, and (2) selected portions of the blown preform are kept warmer and more deformable than the balance of the preform, by preventing as much chilling of such selected portions in the blow mold, (3) the preform is removed from the mold and reshaped by deforming or reshaping the article outside the blow mold by physically deforming said preform at said warmer areas by application of mechanical forces using a solid shaping tool or tools, as opposed to application of pneumatic pressure, and (4) cooling the so reshaped preform to a permanent rigid condition in the shape of the desired final hollow article.

As will be evident to those skilled in the art, various modifications of this invention can be made or followed in the light of the foregoing disclosure and discussion without departing from the spirit and scope of the disclosure or from the scope of the claims.

I claim:

1. A method of forming a plastic container having a reinforced raised circular rim which has at its top a circumferential outwardly radially thickened portion defining a downwardly facing circumferential ledge adapted to be grasped by steel drum chime-handling devices which comprises blow molding a generally tubular plastic parison in a blow mold to produce a preform having a bottom end, a top end and a generally circumferential sidewall between said ends, wherein a rounded peripheral shoulder joins said top and said sidewall which first flares outwardly in the form of the frustum of a cone and subsequently flares inwardly in the form of a first inverted frustum of a cone, said frustum and said first inverted frustum being connected by a circumferential outwardly radially extending rib forming a downwardly facing circumferential ledge meeting the top of said first inverted frustum, and during and immediately after said blow molding differentially cooling the outer surface of the wall of said preform to form a relatively cool and rigid outer skin while maintaining the material between the wall surfaces of said container at a deformable temperature but maintaining the outer skin and interior of the wall of said shoulder and of said rib at a relatively warmer and more easily deformable temperature, removing said preform from said mold cavity, and without further blow holding reshaping said preform by the steps of (1) closing a split ring forming assembly around a portion of said preform to enclose and fit said first inverted frustum and the bottom and sidewall of said rib, (2) thereafter pressing a circumferential shaping ring against said top end in the direction of said bottom end in an area extending radially inwardly from the juncture of said top end and said shoulder, (3) continuing said pressing to reshape said preform by bending said preform (i) at the juncture of said frustum and said rib and (ii) at said rounded shoulder until (a) the curve of said rounded shoulder becomes reversed, (b) said frustum is repositioned inside said first inverted frustum and becomes itself a second inverted frustum parallel to and pressed against said first inverted frustum and (c) the top of said rib becomes the peripheral top of the thus reshaped preform, said reshaping steps (1), (2) and (3) forming a container with an upstanding ring of double-walled thickness having said ledge near its top adapted to be grasped by steel drum chime-handling devices, and cooling the resulting container to a rigid condition.

2. A method of claim 1 wherein said first and second inverted frustums are pressed together between said split ring and an inner skirt portion of said circumferential shaping ring at the final stage of the reshaping step.

* * * * *